Patented Feb. 5, 1935

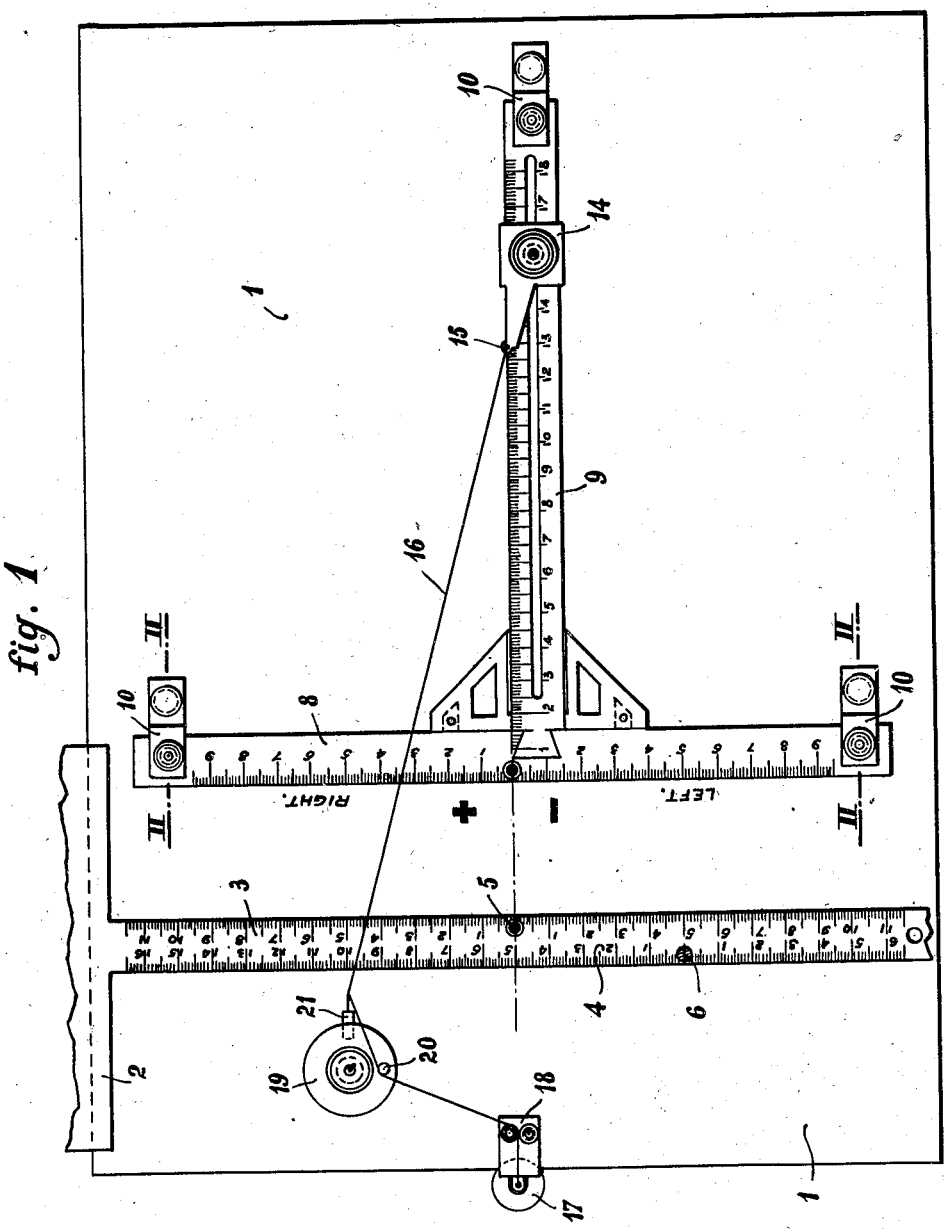

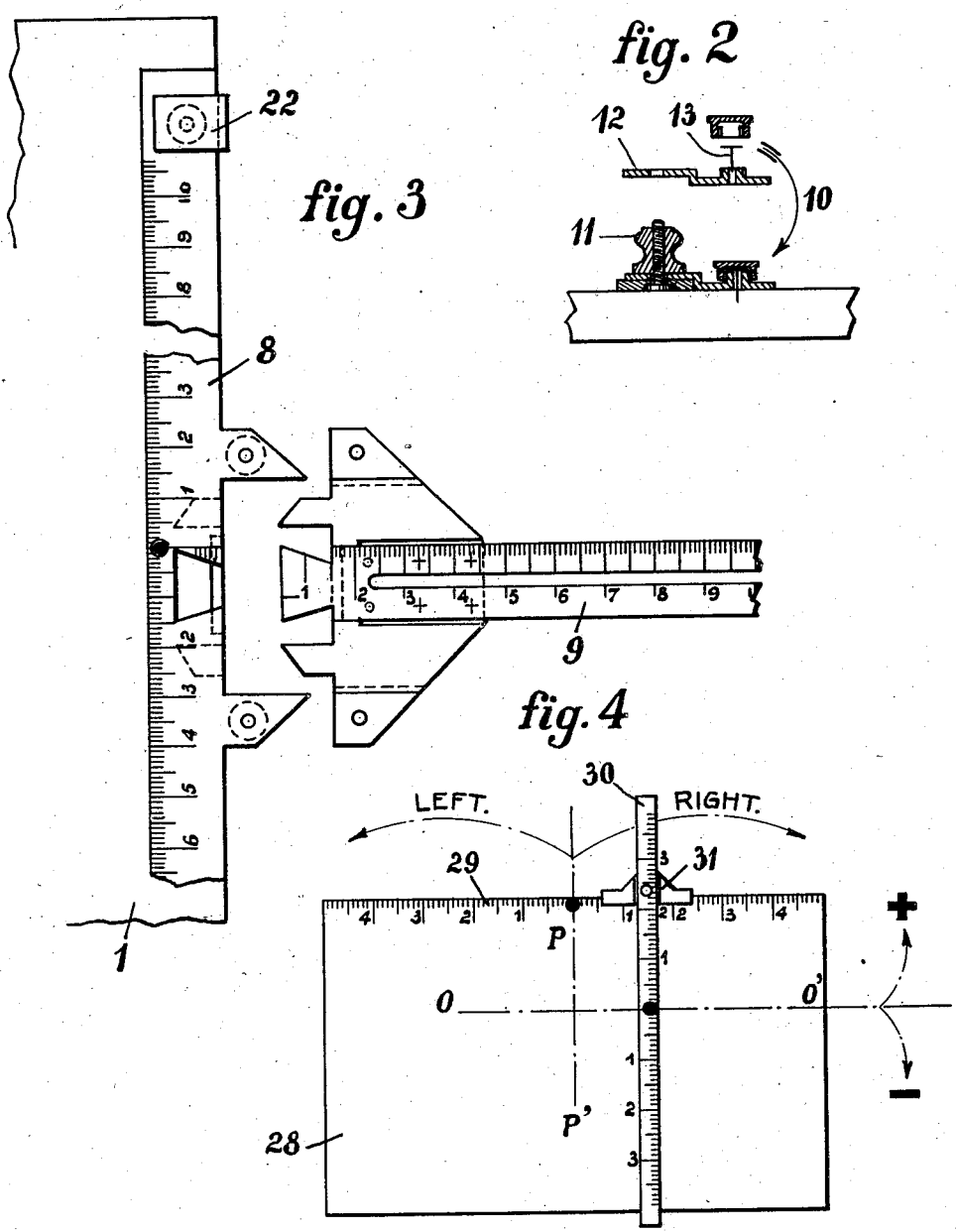

1,990,040

UNITED STATES PATENT OFFICE 1,990,040

PERSPECTIVE DRAWING INSTRUMENT

André Pierre Léopold Launay, Paris, France

Application December 1, 1930, Serial No. 499,385
In France November 30, 1929

6 Claims. (Cl. 33—77)

This invention relates to an apparatus for facilitating the execution of linear perspective drawings without the aid of construction lines or vanishing points.

Apparatus are known for determining auxiliary construction points when these lie outside the plane of the drawing board. Such apparatus are substantially adapted for permitting the use of comparatively small drawing boards for large drawings and their manipulation depends on a knowledge of descriptive geometry. Moreover, automatic apparatus are known which permit by means of a complicated rod system the execution of perspective drawings in such a manner that the elevation and ground plan respectively are traced with a pencil while the perspective drawing is automatically produced more or less completely through the medium of the rod system and a second pencil secured to the latter.

In contradistinction thereto, the apparatus according to the present invention does not depend on a knowledge of descriptive geometry for the execution of the perspective drawing and moreover the errors are obviated which arise in known apparatus by an inaccurate drawing of the auxiliary construction because auxiliary constructions are not necessary. Moreover, complicated rod systems having links, grooved guide members and the like are superfluous which in the case of improper handling easily give rise to inconveniences when drawing and moreover incur a high cost price.

Constructional forms of the invention are shown in the accompanying drawings by way of example.

Figure 1 represents a constructional form of the invention and the relative position of the single elements on the drawing board.

Figure 2 represents the adjusting device of the T-piece according to section II—II of Figure 1.

Figure 3 represents a constructional form of the T-piece wherein one arm of the T-piece is secured to the edge of the drawing board.

Figure 4 represents the construction of the drawing board on which the perspective drawing is produced.

Figure 5:
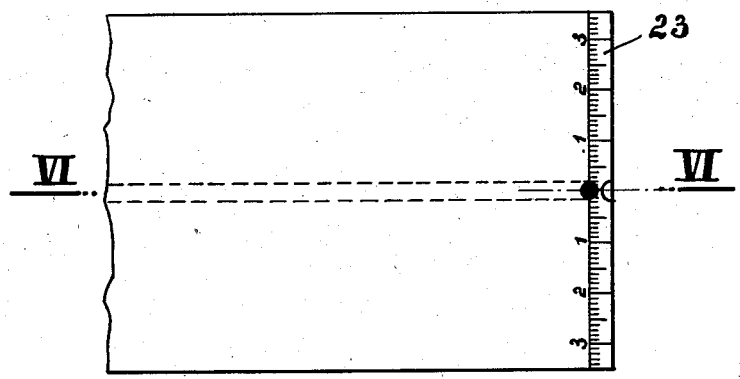
Figure 5 represents a construction form of the T-piece wherein the graduation corresponding to one arm of the T-piece is provided on the edge of the drawing board while the arm which is arranged vertically to this graduation is slidably mounted in the board.

There is provided on an ordinary drawing board 1 a T-square 2 which slides along the edge of the drawing board. The blade of the T-square 2 is provided with graduations 3 and 4 extending from points 5 and 6 respectively. When sliding the T-square, the point 5 always moves in the horizontal plane and consequently indicates the height of the horizon. The height of all points of a drawing (to be shown in perspective) above (+) and below (—) the principal point can be determined by means of the graduation on the T-square. Either the graduation 3 or the graduation 4 is used according to the height of the desired horizontal on the drawing board.

A T-piece 7 is also provided on the drawing board 1. The vertical arm or branch 8 of the T-piece represents the trace of the projection plane and has graduations which correspond to those on the T square and which extend from the principal point as a zero. The horizontal arm 9 of the T-piece represents with its graduated edge the trace of the principal vertical plane when reading in plan and the trace of the principal horizontal plane when reading in elevation, that is to say the height of the horizon.

In order to fix the T-piece on the drawing board fixing devices 10 are provided which consist of an angular metal strip 12 as shown in Figure 2 wherein such a fixing device is shown in section. The said metal strip 12 is clamped to the vertical arm 8 of the T-piece by means of a bolt and nut arrangement 11 while on the other end of the strip a pin 13 is pressed through a hole into the drawing board. A cursor 14 adapted to be adjusted in any position is movably mounted on the horizontal arm 9 of the T-piece. The point 15 of the cursor represents the vanishing point and the distance from the principal point, which is adapted to be measured with the graduated arm 9, is the principal distance.

A thread 16 is attached to the point 15 of the cursor 14. The single visual rays required for the construction are represented with this thread. In order to tension the thread there is attached to the free end thereof a tension weight 17 which hangs down laterally from the drawing board. Moreover, the thread is passed over a device 18 which is provided with rollers and secured on the drawing board preferably at the height of the horizon. The said device 17, 18 may be replaced by a suitable winding and unwinding device. Moreover there is provided for determining the direction of the visual thread a thread guide 19 which is slidably mounted on the drawing board. This thread guide 19 is provided with a pin 20 and a pointer 21 around which the thread 16 is passed. The direction of the visual thread 16 can be accurately determined by means of the pointer 21 that is to say in the course of the hereinafter described determining method for the construction points the thread can be placed through the plan points i. e. through the measuring points of the T-piece and T-square graduation.

In the constructional form according to Figure 3, the arm 8 of the T-piece is secured to the edge of the drawing board by means of clamps 22 so that the entire surface of the drawing board is available. The horizontal arm 9 is removably designed in a simple manner. The construction of the device has otherwise been left unchanged.

Figure 6:
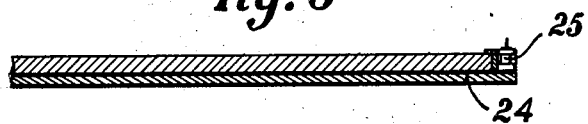
Figure 6 is a section VI—VI of Figure 5 and Figures 7 and 8 represent the constructional form according to Figures 5 and 6 with horizontal arm drawn out of the drawing board.
Figure 7:
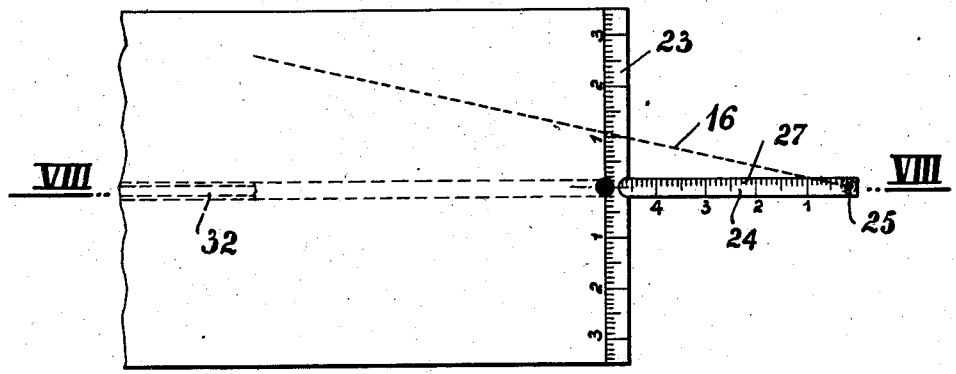
Figure 8:
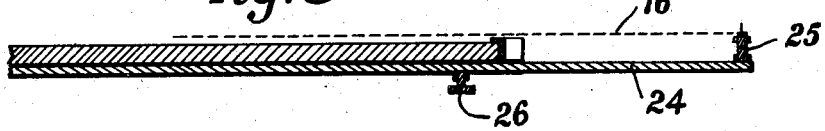

In the constructional form according to Figures 5 to 8, the graduation (which is provided on the arm 8 of the T-piece in Figs. 1 and 3) is provided on the edge of the drawing board as indicated at 23. In this constructional form, the horizontal arm 9 of the T-piece is replaced by a rule 24 adapted to slide through a hollow space 32 in the drawing board. The said rule is provided on its outer end with a pin 25 for the attachment of the visual thread 16. Moreover, the slidable rule is adapted to be adjusted in any drawn out position by means of a screw 26. The extent of the principal distance is fixed by drawing the rule out of the drawing board to a certain extent. This corresponds to the fixing of the principal distance by the cursor 14 in Fig. 1. Since in the constructional form according to Figs. 5-8 the rule 24 is shifted while the point where the visual thread is attached to the rule is fixed with regard to the latter, the graduation 27 thereon, as compared with the graduation on the horizontal arm 9 of the T-piece, as indicated must be inverse.

Further auxiliary devices are explained in the following description of the drawing method.

The manipulation of the apparatus according to the invention for the execution of perspective drawings in plan and elevation will be explained with reference to the construction form shown in Figure 1. The plan of the object to be drawn in perspective is laid on the drawing board 1 and fixed in the desired visual position. The T-square 2 is shifted to the desired projection distance and the T-piece 7 with its arm 8 bears on the T-square so that the principal points on T-square and vertical T-piece arm 8 lie exactly on the same level. The T-piece is then secured on the board by means of the fixing devices 10. The cursor 14 is clamped with its point 15 at the desired principal distance or space on the horizontal arm 9 and the visual thread 16 provided with the weight is attached to the point 15 and passed through the means 18 and the thread guide 19 so that the tension weight freely hangs down as shown. After the T-piece is fixed, the T-square 2 is preferably removed from the drawing board.

By shifting the thread guide 19, the visual thread is now placed through the single corners of the ground plan and for each corner the corresponding point of intersection of the visual thread is fixed with the graduation of the vertical arm 8 of the T-piece and differently according as the point of intersection is on the right or left of the principal point (see Figure 1). These points on the arm 8 of the T-piece representing the trace of the projection plane are the projection points of the ground plan.

A rectangular system of coordinate axes OO′ PP′ has meanwhile been prepared on a separate drawing board 28 (Fig. 4). The axis OO′ represents the horizon while the axis PP′ represents the trace of the principal vertical plane so that the point of intersection of both is the principal point and the drawing plane is the projection plane. According to the invention, the drawing board is provided on the upper edge with a graduation 29 with indicated position of the principal point and carries a slidable T-square 30 also having a graduation and indicated principal point. The T-square is adjustable in its guide member 31 for the adjustment of different heights of the horizon. By means of this device the positions of the points determined on the drawing board 1 can be entered in the system of coordinate axes without the aid of compasses and the like.

The projection points, which are determined on the drawing board 1 as explained above, are entered in the system of coordinate axes on the axis OO′ according to position on the left and right of the principal point. Straight lines drawn vertically to the axis OO′ through these points are the corner edges of the perspective figure.

The height of these corner edges with respect to the horizon is as follows. The extent of the distance of the end points of the corner edges from the desired horizon is determined from the elevation and differently according as they lie below (−) or above (+) the horizon. The T-square 2 is again laid upon the drawing board 1 and placed through a corner of the fixed ground plan while the visual thread 16 is then placed through the measuring points (determined in elevation) on the T square and (+) and (−) from the principal point. The actual points of intersection of the visual thread with arm 8 of the T-piece then indicate the projection points (either above (+) or below (−) the horizon) of the corresponding end points of the corner edges. The same procedure is adopted for all corner points of the ground plan. The measuring values (to be read on arm 8) for the single points are then transferred by means of the T square 30 on the drawing board 28 (Fig. 4) to the perpendicular raised on the axis OO′. The perspective view is obtained by joining the single points.

The apparatus according to the constructional forms of Figures 3 and 5 to 8 are manipulated accordingly.

The execution of perspective views from a given ground plan and elevation is therefore possible by using the apparatus according to the invention without any auxiliary construction and without the use of compasses or the like whereby the result is obtained that the drawing can be executed without any knowledge of descriptive geometry and without the drawing errors caused by auxiliary constructions.

Having thus fully described the invention what is claimed as new and desired to be secured by Letters Patent is:—

1. Apparatus for the semi-mechanical execution of perspective drawing, comprising a drawing board, a T-piece consisting of vertical and horizontal arms fixed to the board, a T-square having a blade movable over the board to remain parallel with the vertical arm of the T-piece and at the left thereof, the blade of the T-square being graduated to establish the elevation location of all of the points of the figure to be shown in perspective, a guiding device including a member fixed to the board to the left of the T-square, a guide thread operably connected to the horizontal arm of the T-piece and extended across the graduated vertical arm and graduated blade and trained about the member, and means for maintaining said guide thread constantly stretched.

2. Apparatus for the semi-mechanical execution of perspective drawing, comprising a drawing board, a T-piece consisting of vertical and horizontal arms fixed to the board, a T-square movable over the board to remain parallel with the vertical arm of the T-piece and at the left thereof, the blade of said T-square being graduated to establish the elevation location of all of the points of the figure to be shown in perspective, a slide guided on the horizontal arm of the T-piece, a guide thread secured to the slide for coaction with the vertical arm of the T-piece and the blade of the T-square.

3. Apparatus for the semi-mechanical execution of perspective drawing comprising a drawing board, a T-piece including vertical and horizontal graduated arms fixed to the board, a T-square having a blade movable over the board to remain parallel to the vertical arm of the T-piece and at the left thereof, the blade of the T-square being graduated to establish the elevation location of all of the points of the figure to be shown in perspective, a cursor slidable and fixable in the desired positions on the horizontal arm, a guide member fixed at the desired position on the board to the left of the T-square, and a flexible member secured to the cursor and extended across the graduated vertical arm and the graduated blade of the T-square and trained about the guide member and a weight on the outer end of the flexible member for maintaining the latter taut.

4. Apparatus as claimed in claim 1, wherein the graduated horizontal arm of the T-piece is also adjustable along the vertical arm.

5. Apparatus permitting the semi-mechanical execution of perspective drawing, comprising the combination of a drawing board, a T-piece consisting of vertical and horizontal arms and capable of being fixed on the board and of which one edge of the vertical arm represents the trace of the plane of projection, said edge being graduated from and on each side of its intersection with the prolongation of one of the edges of the horizontal arm, on which latter arm the vanishing point is fixed and which represents, according to the reading in plan or in elevation, the trace of the principal vertical plane or of the principal horizontal plane, a wire having an end slidably attached to said horizontal arm and stretched across the vertical arm of the T-piece, said wire representing the visual rays or lines of projection radiating from the different points of the figure in plan to read at the intersection of the wire with the graduation of said vertical arm the respective distances of these points on the horizon line of the figure in perspective, on each side of the principal vertical plane, means to keep the thread or wire constantly stretched, a movable T-square parallel to the vertical arm of the T-piece, across which the wire also passes and which is graduated in like units as said T-piece on both sides of a point which indicates the level at which the horizon line represented by the horizontal arm of the T-piece should be drawn.

6. Apparatus permitting the semi-mechanical execution of perspective drawing according to claim 5, comprising the combination of a slide guided on the horizontal arm of the T-piece of which one edge represents the horizon line when reading in elevation the points of the figure to be drawn in perspective, said slide overhanging said edge to determine a point coincident therewith to which the wire is attached and which constitutes the vanishing point, and graduations made on said edge having its zero at the point of intersection of the prolongation of said edge with the graduated edge of the vertical arm of the T-piece, said graduations being for the desired regulation of the position of the slide and of the vanishing point.

ANDRÉ PIERRE LÉOPOLD LAUNAY.